July 8, 1941.  J. WILSON  2,248,148
APPARATUS FOR COMPARING, MATCHING, OR DETECTING COLORS
Filed Feb. 11, 1939  2 Sheets-Sheet 1
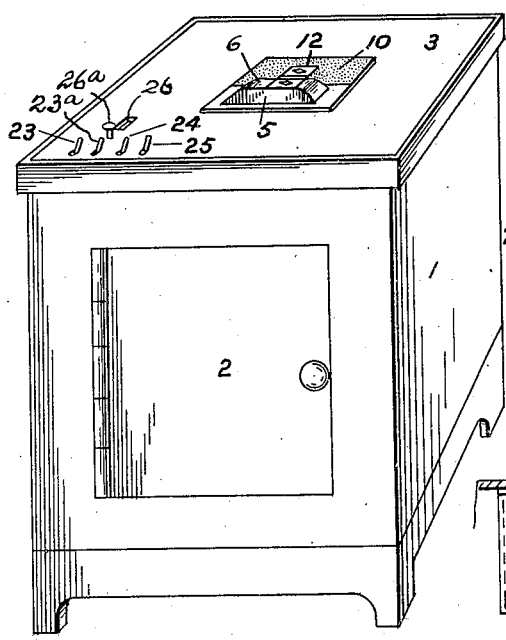
Fig. 1.
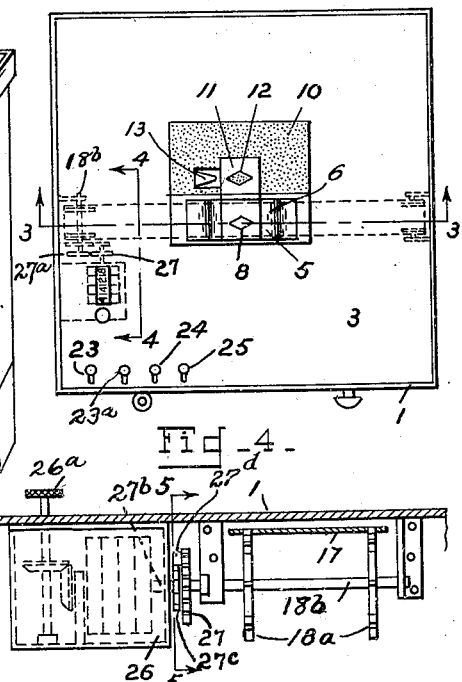
Fig. 2.
Fig. 4.
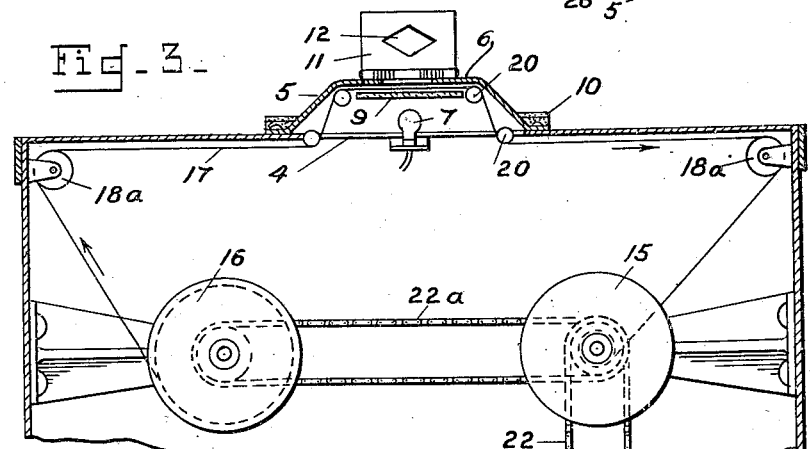
Fig. 3.
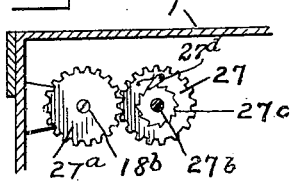
Fig. 5.
INVENTOR:
John Wilson,
BY
ATTORNEY.

July 8, 1941.  J. WILSON  2,248,148
APPARATUS FOR COMPARING, MATCHING, OR DETECTING COLORS
Filed Feb. 11, 1939  2 Sheets-Sheet 2
Fig.-6-
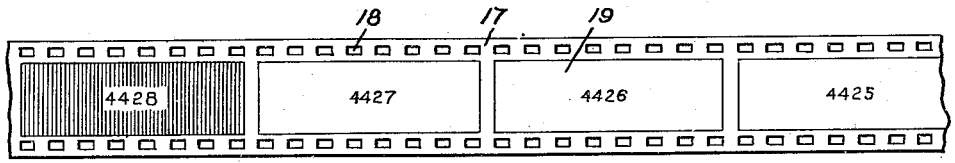
Fig.-7-
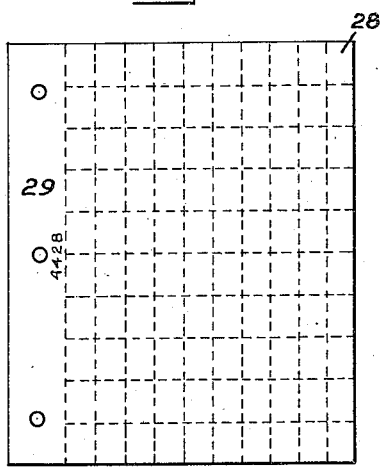
Fig.-8-
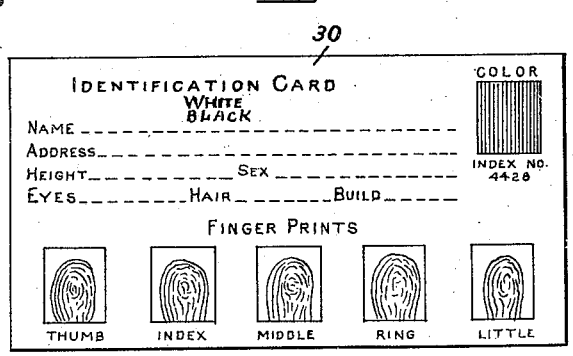
Fig.-9-
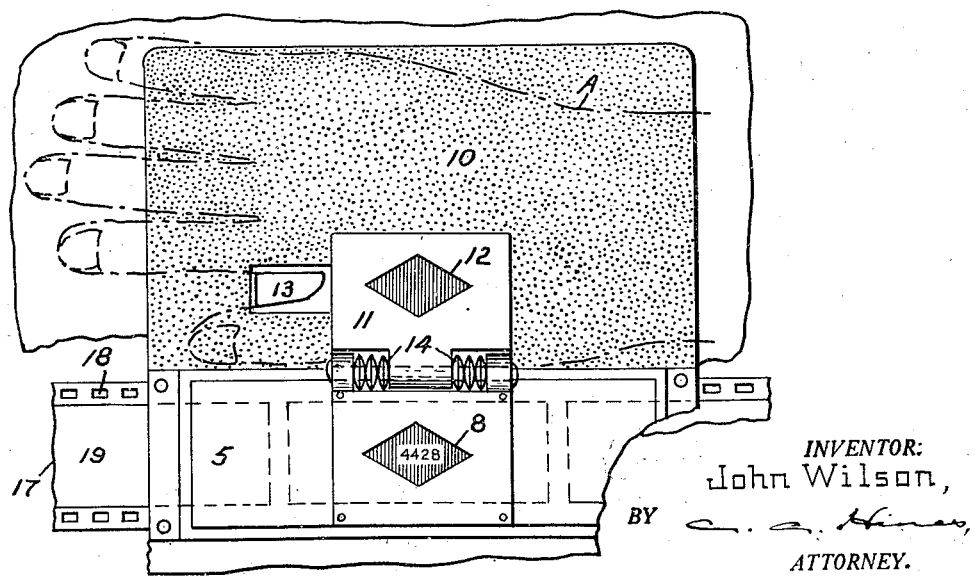
INVENTOR:
John Wilson,
BY
ATTORNEY.

Patented July 8, 1941

2,248,148

UNITED STATES PATENT OFFICE 2,248,148

APPARATUS FOR COMPARING, MATCHING, OR DETECTING COLORS

John Wilson, Washington, D. C.

Application February 11, 1939, Serial No. 256,004

10 Claims. (Cl. 88—14)

This invention relates to an apparatus for comparing, matching or determining colors, such as human skin colors, paint colors, dye and fabric colors, and all other colors, for the purpose of identifying an unknown color or color shade of a general color, or comparing one color or shade of a color with another for the purpose of determining and recording the specific shade or color classification of any particular color shade with relation to a standard or established color scale or an arbitrarily prescribed scale.

The invention provides an apparatus designed and adapted for general uses of the character described, but which is particularly designed and adapted, in the exemplified form shown, for the purpose of determining and indicating the skin colors of human beings so as to furnish a valuable and important aid to police authorities in the detection, apprehension and conviction of persons guilty of criminal offenses, or, conversely, showing the innocence of persons charged with such offenses.

One object of my invention is to provide a means whereby color comparisons throughout a wide range or band or a plurality of ranges or bands may be easily, quickly, conveniently and accurately made to determine the exact color or shade of color of an object or unknown color with respect to a certain fixed or authoritative color band chart or scale.

Another object of the invention is to provide a color comparing or determining and indicating or registration means or system affording a valuable aid to police authorities in conducting criminal investigations and in showing the guilt or innocence of persons suspected of or charged with crime.

The various police departments of the world keep records, based on the well known Bertillon and finger print systems, of the physical characteristics of persons charged with or convicted of criminal and other offenses. These apply to name, alias or aliases, if any, age, height, weight, sex, general build, race, color of hair and eyes, finger prints, physical peculiarities of the individual, criminal record, if any, skin color, etc. Card records of this character are kept so as to be available when needed, and they serve as valuable aids to police authorities in making criminal investigations. Such records are generally defective, however, in merely specifying the general color of the individual as "black," or "white," for example, which gives no exact information as to the color of the individual's skin. A black man, or individual of the colored race, for example, may be of any color ranging from a light brown to a deep black. Furthermore, an individual classed as belonging to the colored race may have a skin color as white as some individuals among those classed as white, so that his color designation from a racial standpoint is not an aid toward identification. Similarly individuals of the white, yellow, brown and other races vary in skin color, so that the general identification data of the character commonly employed with respect to race and race color does not give satisfactory information in this respect.

My invention provides an apparatus and system of identification which overcomes this objection and by means of which the exact color or color shade of the skin of any individual may be determined and a record thereof made, thus giving accurate information of a valuable sort for use in apprehending and convicting persons guilty of offenses against the law or proving the innocence of persons taken upon suspicion or unjustly charged with such offenses.

My invention also provides an apparatus which may also be used by manufacturers, military, naval and immigration authorities and others in comparing, determining and recording colors, as hereinbefore set forth and as hereinafter more fully described.

In the accompanying drawings, illustrating one form of my invention—

Fig. 1 is a perspective view of the apparatus.

Fig. 2 is a top plan view of the same.

Figs. 3 and 4 are vertical sections through the apparatus taken substantially on lines 3—3 and 4—4 of Fig. 2.

Fig. 5 is a section on the line 5—5 of Fig. 4.

Fig. 6 is a plan view of a portion of a color band or chart strip.

Fig. 7 is a view of a color indicating or stamp sheet.

Fig. 8 is a view of a record memoranda card or sheet.

Fig. 9 is a view indicating the manner of positioning the hand of a person for determining skin color.

Referring now more particularly to the drawings, 1 designates a supporting structure, preferably in the form of a cabinet of suitable size, shape and height for the purpose, and having one or more doors 2 affording access thereto. The top 3 of this cabinet is disposed at a convenient level for operating and observation purposes and is provided adjacent one side thereof with an opening 4 above which is arranged an observation hood or housing 5, preferably having a longitudinally curved top 6. In this housing 5, or in the casing in line with the opening 4, is arranged an incandescent lamp or other source of illumination 7. The curved top 6 is provided at a central point with a color display sight opening 8, preferably, but not necessarily of diamond form, and beneath this opening is placed a display panel 9 of glass, preferably ground glass, or other equivalent material.

The side of the housing 5 facing the adjacent side of the casing forms an abutment surface against which the thumb of the extended hand A of a person the color of whose skin is to be detected bears. That portion of the casing top 6 which lies between said side of the casing and the housing forms a support for the person's hand which is rested palm downward thereon. If desired, a seat pad 10 may be provided at this point to form a steady rest for the hand, and this may be of a material which may be readily cleansed to keep it sanitary, or a sheet of sanitary paper for this purpose may be placed on this pad to prevent direct contact between the same and the hand, which sheet may be discarded after use. Pivotally mounted on the housing so as to be tilted downward against the back of the person's hand rested on pad 10 is an observation or sight plate 11 having a color comparison observation or sight opening 12 similar in form to the sight opening 8. This plate when turned down is designed to lie directly in contact with the hand of the person and to dispose the opening 12 parallel with the opening 8 so that both openings will be directly in view of the eyes of the operator and observer at the same time. On the pad or hand supporting portion of the casing top is a wedge-shaped positioning and spreading projection 13 which, when the hand A is placed in proper position, enters into the space between the thumb and forefinger of the hand to spread the same apart so as to expose the triangular web of flesh at the bases of the thumb and forefinger and bring the same in position for clear display through the sight opening 12. The plate 11 by being pivotally mounted may be tilted upward to an out of the way position when not in use and may be tilted downward to different degrees to suit the thickness of the hand resting on the pad. Friction springs 14 or other equivalent holding means may be provided to hold the plate in up-tilted position and to retain it in engagement with and cause it to bear with a desired pressure on the hand or other object. In the event that the hand of the person or other object is small or thin, a suitable removable auxiliary pad or pads may be placed between the pad 10 and the hand or object to take up space and cause the hand or object to lie in close contact with the plate.

The hand of a person has been selected as the most convenient exposed portion of the body of the person to be utilized for the purpose of determining and indicating the normal color of his skin. The triangular web of skin between the thumb and forefinger has also been selected as the most suitable for the purpose since, of the exposed portions of the body, this is the least subject to color changes due to sunburn or other climatic conditions, while more nearly representative at all times of the color of the skin portions of a person exposed to general view. The color of this part of the skin will be found generally accurate and suitable for the purpose of making a skin color test and record. The apparatus may, however, be constructed to make a skin color test of any other part of the body.

Within the casing or cabinet are mounted drums or reels 15 and 16 between which extends a color chart strip, film or band 17. This strip or band is made of cellulosic material similar to that of a moving picture film and is provided with sprocket openings 18 therein for engagement with sprocket teeth on the reels and on suitably positioned steady feed sprockets 18a whereby it is adapted to be unwound from one reel and wound onto the other, and vice versa, either for a feed action or reverse (rewind) action. The strip is colored or tinted to provide consecutive color sections 19, each differing in color tone from preceding and following sections, through a determined color band or scale. These color sections are properly numbered in successive order within a number range indicating the race color represented by the band and these numbers may be indicated on the strip sections or otherwise as hereinafter described. Preferably there is provided a film color chart strip or band for each race, although, in some cases, more than one color chart might be represented on a single strip. Each of these color chart strips will be provided with color grades in its race or color range, and the color sections of the respective strips will be numbered consecutively throughout different number ranges. Thus, for example, the color sections of the white or Caucasian race strip may be in the 1,000 range, or bear numbers between 1,000 and 1,999, those of the brown or Malayan race strip may be in the 2,000 range, those of the yellow or Mongolian race within the 3,000 range, those of the black or Negro race in the 4,000 range.

As shown, a color chart strip when mounted for use on the reels is threaded therebetween over guide rolls 20 so that a portion thereof travels through the housing 5 and in close proximity to or contact with the glass 9 and in such manner that the sections 19 will be consecutively displayed through the opening 8. As each section of the strip alines with the sight opening light from the lamp 7 will shine therethrough so as to distinctly and clearly show the color or color shade of the section. When, therefore, a color strip of a proper race character is in use, and the skin of the person whose skin color is to be determined is displayed through the comparison sight opening 12, it is merely necessary to feed up the strip until a color section thereof compares accurately with the skin color to determine the designated shade of the skin color from the standard color of the chart. By merely changing reels or films on the mounted reels any race chart strip or film may be used to determine the color of the skin of a person of any race. There may be occasions where the skin of a particular person of a certain race, such as a colored person, may be so light or of such a shade of brown as to fall within the Caucasian or Malay classification. In such a case a Caucasian or Malay chart may be used to get the proper skin color classification notwithstanding the racial classification of the person. The rolls 20 and portions of the housing through which the strip travels or which it engages may be provided with layers of a soft material, such as felt, to prevent injury to the surfaces of the strip.

The reels may be driven either continuously or intermittently by a step by step motion to successively bring the color sections of the film into view. An electric motor 21 may be provided for the purpose. One of the reels, as the reel 15, may be driven directly by suitable gearing, as by chain and sprocket gearing 22, from the motor, and the reel 16 may be driven by similar gearing 22a from the reel 15, or directly from the motor if desired, so that one reel will be rotated in winding direction and the other reel in unwinding direction simultaneously. The motor used is of reversible type so that after all or any portion of the film is unwound from the supply reel to the receiving reel it may be rewound on the supply reel to bring it back after each operation to starting position. The electric circuit in which the motor is arranged may be supplied with current by a plug-in connection with a commercial source of current supply or where this is not available a battery may be used. Also where the user does not desire a motor driven device suitable provision for driving the reels by means of manually operable gearing actuated by a hand crank or the like may be employed. Hand crank operated means may also be employed in connection with the motor driving means for actuating the gearing in the event of derangement of the motor. In the use of an electric motor the circuit wiring is such as to provide for starting and stopping actions by means of starting and stopping switches 23 and 23a and of control of the motor for a rewinding action by means of a rewinding switch 24. These switches may be placed at the top of the cabinet so that they may be conveniently operated at will by the operator. Inasmuch as the lamp 7 should glow continuously while the device is in service a separate switch 25 for its control may be employed or it may be automatically set into action when the plug-in connection is applied and cut out when the plug-in connection is disconnected. The electric circuit including the motor and switches may be of any type to suit the character of the motor and switches employed. I have not considered it necessary to enter into detail with respect to these particular features, as they may be of any conventional type and arrangement to suit conditions or the judgment and fancy of the manufacturer.

It is to be understood that while I have shown one specific type of driving means for purpose of exemplification, any standard type or selected type of means for continuously or intermittently feeding and rewinding the film may be employed. In the structure shown a rewinding action may be effected by simply reversing the direction of revolution of the motor, but other means of effecting a rewinding action without using a reversible motor may obviously be employed. In practice, the starting switch may be of a type associated, for example, with a rheostat, whereby the motor may be variably driven for feeding the film at any speed and a similar type of reversing switch may be employed for obtaining a rewinding action at any speed. Furthermore, the starting and stopping switches might be combined or in the form of a single switch having starting and stopping and different speed positions.

As stated, the film color sections may be numbered to indicate their designations according to a number appearing at the sight opening 8 as the color section represented thereby comes into view, but in the present instance I have also shown the use of a number indicator for the purpose, which may also serve as a color or race chart indicator. As shown, an indicator 26 is provided which is mounted on the underside of the top of the casing so that the display elements thereof will show through an opening in the casing top. This may be of a type similar to an automobile speedometer and may be driven by suitable gearing from the film or the motor. In the present instance I have shown an arrangement in which the indicator is driven by a gear 27 which in turn is driven from one of the sprockets 18a, as hereinafter described. It will preferably be of number wheel type in which provision is made for setting up or setting back the number wheels as desired, so that one and the same indicator may be set by manual adjustment independent of the movement of the band to cooperate with any race color band to indicate the numbers of the color sections thereof, and which, at the same time, will be reset or reversed on a reversal or rewinding movement of the band back to starting position from any color indicating position to which it has been adjusted by the feed movement of the band. The sprocket teeth of the drive sprocket 18a of this indicator are so set or numbered with respect to the sprocket openings in the band that the indicator will be advanced in numbering one number on movement of the band to the extent of the length of each color section, which may be of a length corresponding to the spacing of a suitable number of sprocket openings, such as eight sprocket openings, for example, so that accurate indication is ensured. The indicator as shown is set to work with a negro race film in the 4,000 band range and indicates the number in that range representing the color shade displayed at the sight opening 8. If desired, however, suitable means may be provided for reversing the indicator automatically and synchronously with the film or a conventional type of indicator adapted for that purpose may be employed. A manually operated element 26a conventionally illustrated, is here shown which is suitably connected with the indicator mechanism to adapt the same to be turned back to starting position when the film is rewound back to starting position. Other types of indicators may be substituted for that shown, provided they are made to operate in synchronism with the film, or a separate limited range indicator may be used in connection with each different color band film. Also the film sections may be numbered as shown and an indicator also employed to give a double indication if desired.

The gearing for driving the indicator from the film comprises one of the steady-feed sprockets 18a which is herein shown as a double sprocket or two sprocket wheels mounted on a common shaft 18b, the teeth of said wheels engaging the sets of openings at both sides of the film to reduce strain on the film. The shaft 18b also carries a gear 27a which meshes with the gear 27 loosely mounted on a shaft 27b forming part of and which drives the indicating mechanism. On shaft 27b is fixed a ratchet wheel 27c engaged by a spring pressed dog or pawl 27d on the gear 27, whereby a clutch connection is provided for driving the indicator synchronously with the film for a step by step number indicating action when the film is fed forwardly for a color test action. When the film is reversed, however, the dog slides over the teeth of the ratchet wheel to allow free reversal or rewinding motion of the film without resistance from the indicator. As stated, the present construction shows a means 26a to allow the indicator to be reversed independently of the film, although in practice the construction may be such as to adapt the indicator to be reversed with the film and on the rewind motion of the latter.

It will be understood, of course, that with the construction shown, or by suitable modification of the object holding means, the apparatus may be used for comparing the colors of goods or substances of various kinds for matching colors or determining the true values of unknown or undetermined colors with respect to standard or accepted colors, shown by chart films, and for other analogous uses, and hence I do not limit my invention in the appended claims to any particular use or uses unless and when distinctly specified. While the invention is designed for general uses, it will, however, be found of especial value for skin color detection, apprehension and conviction of persons guilty of unlawful acts or to determine the innocence of many unjustly charged with offenses. By the use of this apparatus records may be made of the exact skin colors of known malefactors to supplement the usual records, incomplete and defective in this respect, so as to facilitate the work of police authorities in identifying persons wanted. Records of this character alone or in connection with others will often also greatly assist police authorities in determining whether or not suspected persons are guilty or innocent of an offense for which an offender is sought.

It will also be understood that the apparatus will be found of service to military, naval, immigration and census taking authorities in compiling and keeping accurate identification records of soldiers, sailors, immigrants and other individuals, as well as to large business establishments and organizations in keeping records of individuals in their employ or connected with their organizations.

There may be provided, as shown in Fig. 7, for use in connection with the apparatus means for indicating and applying to record memoranda cards or sheets indicators showing the colors of the materials or skins of the individuals tested or determined by the apparatus. These indicators may be in the form of colored labels 28 of paper or other suitable material. These labels will correspond in color to and bear the same numbers as the color sections of the race film bands which they represent, and each label may be gummed so that it may be applied to the memoranda card or sheet. For convenience any desired number of like labels 28 may be put up for use in the form of a multiple label or stamp sheet 29 perforated to allow the color stamps or labels 28 to be separated for individual use. Any number of sheets of like character may be bound within a suitable cover for protection and ready removal of labels as ossasion requires. The sheets may be, as shown, of loose-leaf type for ready application between the leaves of a loose-leaf binder. Sets of leaves representing all colors or shades of colors of all races or color film bands may thus be stored in a holder or cabinet in classified arrangement for convenient removal and use.

The memoranda card or sheet to which the stamps or labels are to be affixed may be of any type for the use to which they are to be applied. Fig. 8 shows a simple form of memoranda card or sheet 30 for criminal identification use bearing appropriately designated spaces for the name, address, color of hair and eyes, weight and height of the individual, spaces for the individual's finger prints, and a space to receive a color stamp or label 28 showing the color of the skin of the individual. Appropriately designated spaces for other desired data may also be used, but the card shown is sufficient to indicate the mode of use of the color stamps. Such stamps kept at police headquarters of any city or at a criminal identification bureau may be given to an officer delegated to apprehend a certain person or sent to other police headquarters in order that each may have an accurate indication of the skin color of the person wanted. The value of skin color indication is that skin color cannot readily be disguised and, taken with other known physical characteristics or peculiarities not readily changeable, will aid materially in the apprehension of a wanted person, notwithstanding the fact that such person may disguise his facial appearance or have his finger print marks surgically obliterated. The value of the apparatus and record data provided in matching and determining colors for general purposes will also be readily understood.

The apparatus herein shown may be of stationary or portable character to be used in a fixed position or moved from place to place as required.

While the structure of the apparatus shown is a preferred one for its stated purpose, it is to be understood that the invention is not limited thereto, but that changes in the form, construction and arrangement of parts may be made, within the scope of the appended claims, without departing from the spirit or sacrificing any of the advantages of the invention.

What I claim is:

1. In an apparatus for determining the color of a person's skin, a supporting structure having a color display opening and a steady rest adapted to support, palm downward, a hand of the person whose skin color is to be determined, a spreader carried by the steady rest in proximity to the display opening to engage between and hold the thumb and forefinger of the hand spread so as to stretch and dispose for observation the skin of a portion of the hand between said parts thereof, a member mounted on the supporting structure alongside said color display opening so as to overlie the supported hand, said member having a color comparison opening therein arranged so that the skin stretched by the spreader will be disposed beneath the comparison opening and visible therethrough for comparison with a color displayed through the color display opening, a movable color scale indicator mounted for movement to expose portions thereof through the color display opening and provided with sequentially arranged colored portions representing different colors of a color group adapted to be successively exposed through the display opening, and means for moving said indicator relatively to the display opening.

2. A device of the character described comprising a supporting structure having a color display opening, a member having a color comparison opening located side by side with said color display opening, a supporting surface located beneath said member for supporting in position to be displayed through said color comparison opening an object to be viewed whose color shade of a certain general color is to be determined with reference to a known shade of a number of shades of the same general color based upon an established color scale, means for holding and positioning said object on said surface with relation to the color comparison opening, said means including a spreader for spreading portions of the object apart to stretch an intervening portion, said spreader being spaced from the member so that the stretched portion of the object will be disposed beneath the color comparison opening and visible therethrough, said member and means being relatively adjustable to suit the thickness of the object to be supported and displayed, a movable color scale indicator bearing sequentially color shades of the general color, and means for moving said indicator to sequentially bring the color shades thereon beneath the color display opening for comparison with the color displayed through the color comparison opening.

3. A device of the character described comprising a casing having an opening in its top, a hood surmounting said opening and having a color display opening in alinement therewith, a member supported by the hood and overlying the top of the casing and provided with a color comparison opening, said color display and color comparison openings being arranged side by side and adjacent to each other so as to be simultaneously viewed, means on the casing beneath said member for supporting an object whose color or color shade is to be determined so as to be viewed through the color comparison opening, guiding elements in the hood, a pair of spaced reels in the casing, a movable translucent color scale strip connected at one end to one of the reels and at its other end to the other reel and having a portion trained over the guiding elements in the hood for travel between the reels and through the hood beneath the color display opening therein and having sequentially arranged color portions of different color values in the scale, illuminating means arranged for the transmission of light therefrom through the portion of the strip disposed beneath the color display opening in the hood, and driving means for the reels, said reels having sprocket teeth and said strip having sprocket openings therein engaging said sprocket teeth.

4. A device of the character described comprising a casing having an opening in its top, a hood surmounting said opening and having a color display opening in alinement therewith, a member supported by the hood and overlying the top of the casing and provided with a color comparison opening, said color display and color comparison openings being arranged side by side and adjacent to each other so as to be simultaneously viewed, means on the casing beneath said member for supporting an object whose color or color shade is to be determined so as to be viewed through the color comparison opening, guiding elements in the hood, a pair of spaced reels in the casing, said reels being provided with sprocket teeth, a movable translucent color scale strip having sprocket openings therein engaging the sprocket teeth of the reels, said strip being connected at one end to one of the reels and at its other end to the other reel and having a portion trained over the guiding elements in the hood for travel between the reels and through the hood between the light emitting and color display openings and having sequentially arranged colored portions of different color values in the scale, illuminating means arranged for the transmission of light therefrom through the portion of the strip disposed in the hood, an indicator in gear with one of the reels and operated in accordance with the sprocket feed action for giving an indication of the color value of each colored portion of the strip as it is displayed, a motor driven gearing for driving the reels simultaneously in the same direction and at the same rate of speed, and means for starting, stopping and reversing the driving action of the gearing.

5. In an apparatus for determining the color of a person's skin, a supporting structure having portions provided with a color display opening and a color comparison opening arranged side by side and substantially in the same horizontal plane so as to be simultaneously viewed, means on said supporting structure arranged adjacent to said portion thereof provided with the color comparison opening and underlying the same for supporting a part of the person whose skin color is to be viewed and stretching a portion of the skin of said part and disposing the same for view through the comparison opening, a movable color scale indicator mounted for movement to expose portions thereof through the display opening and provided with sequentially arranged colored portions representing different colors of a skin color group adapted to be successively exposed through the display opening, and means for moving said indicator relatively to the display opening.

6. In an apparatus for determining the color of a person's skin, a supporting structure having a color display opening and a color comparison opening arranged side by side and substantially in the same horizontal plane so as to be simultaneously viewed, means on said supporting structure arranged adjacent to said color comparison opening for supporting and holding in fixed position a part of the person and stretching a portion of the skin of said part and disposing the same for view through the comparison opening, a movable color scale strip mounted for movement to expose portions thereof through the display opening and provided with sequentially arranged colored portions and color scale designations applying thereto representing different colors of a color group adapted to be successively exposed through the display opening, means for moving said strip relatively to the display opening, and an indicator coordinately controlled in action with the movement of the strip for giving color designations corresponding to those of the colored portions of the strip as they are displayed through the display opening.

7. A device of the character described comprising a casing having an opening in its top, a hood overlying and covering said opening and having a color display opening in its top, a member having a color comparison opening supported alongside the hood so as to dispose the color display and color comparison openings side by side and adjacent to each other so as to be simultaneously viewed, a light producing source for directly illuminating the interior of the hood so that light rays from said source will be concentrated substantially within the hood for emission through the light emitting opening, means on the casing for holding in proper position below said member and the color comparison opening an object to be viewed whose color shade of a certain general color is to be determined with reference to a known shade of a number of shades of the same general color based upon an established color scale, guiding elements within the upper portion of the casing on opposite sides of the opening in the casing, guiding elements in the hood, a movable color scale strip bearing sequentially color shades of the general color, said strip being trained at points in its path of movement over the first-named guiding elements for horizontal travel beneath the top of the casing and having a portion deflected upwardly from said horizontally traveling portion and trained over the guiding elements in the hood for travel beneath the light emitting opening in the hood and between the same and the light producing source, and feeding means mounting the strip for travel within the casing and over the said guiding elements to sequentially bring the color shades thereon into position to be illuminated by the illuminating means and displayed through the color display opening for comparison with the color displayed through the color comparison opening.

8. A device of the character described comprising a casing having an opening in its top, a hood surmounting said opening and having a color display opening therein, a member having a color comparison opening arranged so as to dispose the color display and color comparison openings side by side and adjacent to each other and so as to be simultaneously viewed, means on the casing for holding in proper position below said member and color comparison opening an object to be viewed whose color shade of a certain general color is to be determined with reference to a known shade of a number of shades of the same general color based upon an established color scale, a light producing source arranged to directly illuminate the interior of the hood and so as to concentrate the light rays therefrom within the hood for emission through the light emitting opening, guiding elements on the interior of the casing at opposite sides of the opening therein, guiding elements within the hood, spaced reels in the casing below the level of the first-named guiding elements, a movable linear light transmitting color indicating strip bearing sequential color shades of the general color adapted to be displayed successively at the display opening, said strip being connected at its respective ends to the respective reels for unwinding and winding motions on and from each reel and being trained at points in its path of movement over the first-named guiding elements for horizontal travel beneath the top of the casing and having a portion deflected upwardly from said horizontally traveling portion and trained over the guiding elements in the hood for travel beneath the light emitting opening in the hood and between the same and the light producing source, and means for driving the reels and moving said strip to successively bring the color shades thereon into position for the transmission of light therethrough and for display through the display opening for comparison with the color displayed through the color comparison opening.

9. In an apparatus for determining the color of a person's skin, a supporting structure having a color display opening and a steady rest on which may be disposed a part of the body of the person the color of whose skin is to be determined, a member pivotally mounted on the supporting structure adjacent to the display opening for adjustment toward and from the rest and into and out of cooperative relation to said part of the body engaging the steady rest, said member having a color comparison opening therein to expose therethrough a portion of the skin of said body part, means for holding said member resistant to displacement when engaged with the body part in any of its positions of adjustment, a movable color scale indicator mounted for movement to expose portions thereof through the display opening and provided with sequentially arranged colored portions representing different colors of a color group adapted to be successively exposed through the display opening, and means for moving said indicator relatively to the display opening.

10. In an apparatus for determining the color of a person's skin, a supporting structure having a color display opening and a steady rest on which may be disposed a part of the body of the person the color of whose skin is to be determined, a member adjustably mounted on the supporting structure adjacent to the display opening and above said steady rest so as to be moved toward and from and into and out of cooperative relation to said part of the body engaging the steady rest, whereby said member may be disposed in working position at different distances from the steady rest, and in contact with body parts varying in thickness, means for holding said member resistant to displacement when engaged with the body part in any of its adjusted positions, said member having a color comparison opening therein to expose therethrough a portion of the skin of said body part, a movable color scale indicator mounted for movement to expose portions thereof through the display opening and provided with sequentially arranged colored portions representing different colors of a color group adapted to be successively exposed through the display opening and with sprocket openings at opposite sides of said colored portions, sprocket feed mechanism coacting with said openings for moving said indicator relatively to the display opening, and an indicator driven by the sprocket feed mechanism and coordinately controlled in action therewith and with the movement of the strip for giving color designations of the colored portions of the strip as they are displayed through the display opening.

JOHN WILSON.